UNITED STATES PATENT OFFICE.

JOHN R. DULANY, OF PITTSBURGH, PENNSYLVANIA.

METHOD OF CLEANING OIL AND GAS WELLS.

1,351,945.  Specification of Letters Patent.  Patented Sept. 7, 1920.

No Drawing.  Application filed November 1, 1919. Serial No. 335,203.

*To all whom it may concern:*

Be it known that I, JOHN R. DULANY, a citizen of the United States, and a resident of Pittsburgh, in the county of Allegheny and State of Pennsylvania, have invented certain new and useful Improvements in Methods of Cleaning Oil and Gas Wells; and I do hereby declare the following to be a full, clear, and exact description of the invention, such as will enable others skilled in the art to which it appertains to make and use the same.

My invention relates to an improvement in the method of cleaning paraffin and other deposits from oil and gas wells.

It is well known that oil and gas wells, after having been used become more or less clogged or sealed by the accumulation of paraffin, which separates from the petroleum and adheres to the wall of the well thus closing the fissures in the rock through which the oil passes to the well, hence it is necessary to remove these deposits or abandon the well.

Various methods and means have been tried out for removing these deposits, but none have been entirely successful for various reasons.

The object of my invention is to provide a new and improved method for removing such deposits without the employment of any special plant or apparatus, and it consists in introducing salt water into the well and adding thereto a preparation or compound which when mixed with the water will generate sufficient heat to melt the wax and thin the oil and hold the melted wax in solution until it can be pumped out.

In treating a well that is choked with paraffin or other matter, I pour into the well about one barrel of salt water, and to this I add about seventy five pounds of a dry compound composed of an alkali metal hydrate such as caustic alkali and aluminum, the latter being in the form of chips or granulated, in about 86% of caustic alkali to 14 per cent. of aluminum, the dry compound being added to the salt water after the latter has been deposited in the well. The addition of the compound of caustic alkali and aluminum to the salt water in the well generates a heat, without any flame whatsoever, which heats the liquid in the well up to approximately the boiling point of water, which is sufficient to melt all the paraffin or wax adhering to the wall of the well and in the crevices exposed to heat, and this generation of heat will continue as long as any of the two ingredients remain in the solution.

After a lapse of about thirty minutes, and while the solution is still hot, I flush the well with crude oil, and in practice I have found that from one to four barrels are sufficient. This crude oil takes up the melted paraffin and dirt melted and dislodged by the heat and agitation caused by the boiling action of the salt water and holds it in suspension sufficiently long to be pumped out. The pumping should be begun just after flushing and is continued until all the paraffin and other matter dissolved and dislodged by the heat and mechanical action of the boiling mixture have been withdrawn. The well should then be again flushed with oil and the pump again started.

While I have referred to the proportions of alkali-metal hydrate, aluminum and salt water which I have found to be efficient in use, I would have it clearly understood that I do not confine myself to such proportions, but claim the method of first introducing salt water to the well, adding a mixture of alkali-metal hydrate and aluminum to the water; flushing the well with crude oil and then pumping out the crude oil and the matter held in suspension or solution therein.

Having fully described my invention what I claim as new and desire to secure by Letters-Patent, is:

1. The method herein described of removing deposits from oil and gas wells which consists in introducing water into the well, adding a dry compound of alkali-metal hydrate and aluminum to the water; permitting the solution thus formed to remain in the well for a period sufficient for the heat generated by the mixture to soften the oil and wax adhering to the sides of the well and then pumping it out.

2. The method herein described of removing deposits from oil wells, oil tanks and the like, consisting in introducing water into the well, adding a dry compound of caustic alkali and comminuted aluminum to the water, permitting the solution thus formed to stand for a period, flushing the well with crude oil, and then pumping out the contents of the well.

3. The method herein described of removing deposits from oil wells, oil tanks and the like consisting in introducing water into the well, adding a dry compound of alkali-metal hydrate and aluminum to the water, letting the solution thus formed stand for a short period, flushing the well with crude oil, pumping out the solution and oil, and then again flushing with oil.

In testimony whereof, I have signed this specification in the presence of two subscribing witnesses.

JOHN R. DULANY.

Witnesses:
R. B. DE CONDRES,
H. E. HOLLENSBE.